UNITED STATES PATENT OFFICE.

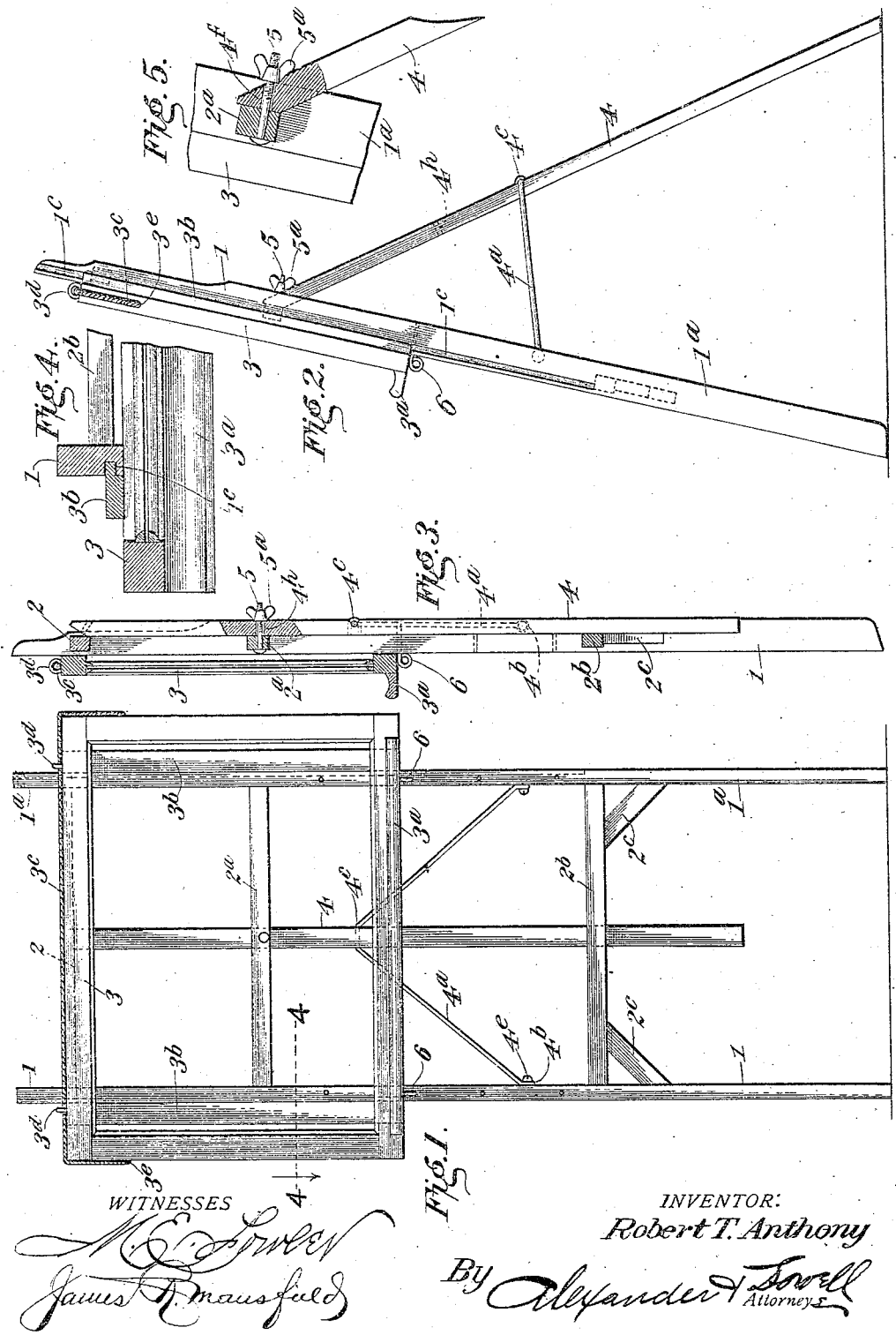

ROBERT T. ANTHONY, OF SLATINGTON, PENNSYLVANIA.

EASEL.

No. 855,743.  Specification of Letters Patent.  Patented June 4, 1907.

Application filed December 27, 1906. Serial No. 349,638.

*To all whom it may concern:*

Be it known that I, ROBERT T. ANTHONY, of Slatington, in the county of Lehigh and State of Pennsylvania, have invented certain new and useful Improvements in Easels; and I hereby declare that the following is a full, clear, and exact description thereof, reference being had to the accompanying drawings, which form part of this specification.

This invention is an improvement in easels for holding slates, black-boards, drawing-boards, canvas, etc., and its objects are to provide a light, neat, and easily adjusted easel and frame capable of being folded and held in small compass, and useful wherever a light portable easel and frame well braced and steady is desired.

The invention in particular is an improvement upon the easel for which I obtained Letters Patent Number 728,653 on the 9th of May 1903, and it consists in the novel construction and combination of parts hereinafter described and claimed, and illustrated in the accompanying drawings in which—

Figure 1 is a front view of the complete easel. Fig. 2 is a side view thereof. Fig. 3 is a vertical sectional view thereof showing the leg closed. Fig. 4 is a transverse section on line 4—4, Fig. 1. Fig. 5 is a detail.

The easel comprises opposite uprights 1, 1$^a$, which are connected near the top and bottom and at an intermediate point by cross-bars 2, 2$^a$, 2$^b$, as shown. Preferably these bars are secured to the uprights by mortise and tenon joints so that the stand thus formed will be stiff and rigid. The lower part of the stand may be stiffened by inclined braces 2$^c$ connected to and between the under side of lower bar 2$^b$, and the adjacent uprights 1, 1$^a$.

The uprights 1, 1$^a$, have longitudinal grooves 1$^c$ in their outer sides, near their front edges, extending from the lower bar 2$^b$ to the top of the uprights, which grooves are engaged by tongued-bars 3$^b$ attached to the rear side of the adjustable frame 3, which frame is preferably wider than the breadth of the easel stand, and is provided at bottom with a shelf-bar 3$^a$ to hold pencils, brushes, etc. The tongued-bars 3$^b$ are perpendicular to the frame and stiffen same, and being arranged so as to come outside the bars 1$^a$, they hold the frame securely and steadily in position on the stand and keep the frame from sagging. The frame 3 is preferably formed of wood so as to be light, and it may contain slate, canvas or other desired material, upon which the artist or user is to work. The frame 3 moreover is provided with a cord 3$^c$ which extends over the top bar of the frame, being guided through eyes 3$^d$, attached thereto, and having its ends fastened to the sides of the frame as at 3$^e$.

The stand is provided with an adjustable leg 4, which can be folded against the bars 2$^a$, 2$^b$, as shown in Fig. 3, when not in use, or can be extended as shown in Fig. 2 to uphold the easel. This leg is attached to the uprights 1, 1$^a$, by means of a wire bail 4$^a$, which is centrally pivoted to the leg, as at 4$^c$, and has its opposite ends pivoted to the inner sides of the uprights 1, 1$^a$, as shown. The ends of the bail may be provided with eyes 4$^b$ engaged by screws 4$^e$ as shown. The upper end of leg 4 has a slot or perforation 4$^f$, which when the leg is extended, as in Fig. 2, is engaged by a threaded bolt 5 attached to bar 2 and projecting rearwardly therefrom, and a wing-nut 5$^a$ on the rear end of the bolt fastens the leg securely thereto. When the leg is to be folded, the wing-nut 5$^a$ is removed, the leg can then be moved up against the bars 2, 2$^a$, 2$^b$, parallel with the uprights, and bolt 5 then passed through a hole 4$^h$ in the leg, and when the nut 5$^a$ is screwed on the bolt the leg is secured in the folded position, and the easel can then be easily transported. It will be observed that the bail 4$^a$ causes the leg 4 to swing downwardly away from the frame as it is opened up, and to swing upwardly toward the frame as it is folded.

This construction produces a light, portable easel, which is very stiff and strong when opened up for use, and which can be folded flat into small compass when not in use. The frame 3 can be easily removed from the easel by sliding it upward until the tongued-bars 3$^b$ disengage grooves 1$^b$,—but when the frame is in position on the bars, it is securely held from tilting forwardly or laterally, and it also serves as a lateral bond between the uprights. The frame 3 can be supported in any position on the easel by means of removable pins 6 engaging apertures in the uprights as usual in easels. When the frame is removed it can be easily carried or hung up by means of the cord 3$^c$.

Having described my invention what I claim as new and desire to secure by Letters Patent is:

1. In an easel, the combination of opposite uprights, transverse bars rigidly connecting the uprights, an adjustable leg, a bail pivotally connected to the leg and to the opposite uprights, and a fastening device connected to one of the transverse bars adapted to engage the upper end of the leg when it is extended, to fasten it in extended position and to also secure the leg in closed position.

2. The combination in an easel, of opposite uprights, transverse bars rigidly connecting the uprights, an adjustable leg, a bail pivotally connected at center to the leg and at its ends to the opposite uprights, and a bolt connected to one of the transverse bars, and adapted to engage a slot in the upper end of the leg, to fasten the leg in extended position, and also to engage another hole in the leg to secure it in closed position, substantially as described.

3. The combination in an easel, of opposite uprights having longitudinal grooves in their outer faces, transverse bars fixedly connected to said uprights, a removable frame having tongued-bars attached to its rear side engaging the grooves in the uprights, an adjustable leg having a slot in its upper end and an opening below the slot, a bail pivotally connected at center to the leg, and having eyes on its ends pivoted to the uprights, a bolt attached to one of the cross-bars and adapted to engage the slot in the upper end of leg to fasten it in extended position, or to engage the hole in the leg to secure it in closed position, substantially as described.

In testimony that I claim the foregoing as my own, I affix my signature in presence of two witnesses.

ROBERT T. ANTHONY.

Witnesses:
G. T. OPLINGER,
W. W. HUGHES.